(12) United States Patent
Wu (10) Patent No.: US 10,624,009 B2
(45) Date of Patent: Apr. 14, 2020

(54) DEVICE AND METHOD OF HANDLING CELLULAR-WLAN AGGREGATION AFTER HANDOVER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 133 days.

(21) Appl. No.: 15/698,663

(22) Filed: Sep. 8, 2017

(65) Prior Publication Data

US 2018/0070276 A1 Mar. 8, 2018

Related U.S. Application Data

(60) Provisional application No. 62/385,216, filed on Sep. 8, 2016, provisional application No. 62/393,104, filed on Sep. 12, 2016.

(51) Int. Cl.
*H04W 36/00* (2009.01)
*H04L 5/00* (2006.01)
(Continued)

(52) U.S. Cl.
CPC ............ *H04W 36/14* (2013.01); *H04L 5/001* (2013.01); *H04L 5/0092* (2013.01);
(Continued)

(58) Field of Classification Search
CPC . H04W 36/14; H04W 12/04; H04W 36/0069; H04W 36/165; H04W 76/028;
(Continued)

(56) References Cited

U.S. PATENT DOCUMENTS

2003/0161284 A1* 8/2003 Chen .................. H04L 29/06
370/331
2014/0235285 A1* 8/2014 Stojanovski ............ H04W 4/14
455/466

(Continued)

OTHER PUBLICATIONS

Ericsson, "Security for WLAN aggregation", 3GPP TSG-RAN WG2 #92, Tdoc R2-156603, Nov. 16-20, 2015, Anaheim, USA, XP051005977, pp. 1-4. (Year: 2015).*

(Continued)

*Primary Examiner* — Edan Orgad
*Assistant Examiner* — Vanneilian Lalchinthang
(74) *Attorney, Agent, or Firm* — Winston Hsu (57) ABSTRACT

A communication device for handling a cellular-wireless local area network (cellular-WLAN) aggregation (CWA) comprises a storage device for storing instructions of receiving a first configuration configuring a CWA for a radio bearer, from a first cell of a cellular network; enabling the CWA for the radio bearer in response to the first configuration; receiving a handover command from the first cell, when enabling the CWA, wherein the handover command configures the communication device to perform a handover to a second cell of the cellular network; keeping enabling the CWA for the radio bearer in response to the handover command, when the handover command comprises a second configuration; and disabling the CWA for the radio bearer in response to the handover command, when the handover command does not comprise the second configuration.

17 Claims, 10 Drawing Sheets

(51) Int. Cl.
  *H04W 36/14*   (2009.01)
  *H04W 12/04*   (2009.01)
  *H04L 12/24*   (2006.01)
  *H04W 36/16*   (2009.01)
  *H04W 12/06*   (2009.01)
  *H04W 76/19*   (2018.01)
  *H04W 76/27*   (2018.01)
  *H04W 84/04*   (2009.01)
  *H04W 84/12*   (2009.01)

(52) U.S. Cl.
  CPC ......... *H04L 41/0803* (2013.01); *H04W 12/04* (2013.01); *H04W 36/0069* (2018.08); *H04W 36/165* (2013.01); *H04W 12/06* (2013.01); *H04W 36/0027* (2013.01); *H04W 76/19* (2018.02); *H04W 76/27* (2018.02); *H04W 84/042* (2013.01); *H04W 84/12* (2013.01)

(58) Field of Classification Search
  CPC .......... H04W 36/0033; H04W 36/0027; H04L 41/0803; H04L 5/001; H04L 5/0092
  USPC .......................................... 370/331
  See application file for complete search history.

(56) References Cited

U.S. PATENT DOCUMENTS

| | | | | |
|---|---|---|---|---|
| 2016/0278138 A1* | 9/2016 | Chen | .................. | H04W 36/0027 |
| 2017/0048702 A1* | 2/2017 | Barrett | .................. | H04W 12/06 |
| 2017/0118133 A1* | 4/2017 | Meylan | .................. | H04L 47/624 |
| 2017/0135147 A1* | 5/2017 | Belghoul | .............. | H04W 76/36 |
| 2017/0338937 A1* | 11/2017 | Laselva | .................. | H04W 12/02 |
| 2018/0192331 A1* | 7/2018 | Masini | .............. | H04W 36/0027 |
| 2018/0198566 A1* | 7/2018 | Yi | .......................... | H04W 28/02 |
| 2018/0227752 A1* | 8/2018 | Teyeb | .................. | H04W 12/04 |
| 2018/0262465 A1* | 9/2018 | Maattanen | ............ | H04W 12/02 |
| 2018/0324899 A1* | 11/2018 | Sivavakeesar | ........ | H04W 76/16 |

OTHER PUBLICATIONS

Search Report dated Feb. 5, 2018 for EP application No. 17190170.5, pp. 1-5.

Ericsson, "Security for WLAN aggregation", 3GPP TSG-RAN WG2 #92, Tdoc R2-156603, Nov. 16-20, 2015, Anaheim, USA, XP051005977, pp. 1-4.

Nokia, Alcatel-Lucent Shanghai Bell, "Inter-eNB HO without WT change—solution considerations", 3GPP TSG-RAN WG3 Meeting #92, R3-161068, May 23-27, 2016, Nanjing, P.R.China, XP051105878, pp. 1-7.

Samsung, "LWA DRB reconfiguration, RRC PDU and procedural aspects", 3GPP TSG-RAN2#93 meeting, Tdoc R2-161223, Feb. 15-19, 2016, St Julian's, Malta, XP051065596, pp. 1-12.

3GPP TSG-RAN WG2 Meeting #95 R2-165932 Gothenburg, Sweden, Aug. 22-26, 2016 CR-Form-v11.1 Change Request 36.300 CR draftCR rev—Current version: 13.4.0.

3GPP TSG-RAN2 Meeting #95 R2-165933 Gothenburg, Sweden, Aug. 22-26, 2016 CR-Form-v11.1 Change Request 36.331 CR draftCR rev—Current version: 13.2.0.

* cited by examiner

DEVICE AND METHOD OF HANDLING CELLULAR-WLAN AGGREGATION AFTER HANDOVER

CROSS REFERENCE TO RELATED APPLICATIONS

This application claims the benefits of U.S. Provisional Applications No. 62/385,216 filed on Sep. 8, 2016 and No. 62/393,104 filed on Sep. 12, 2016, which are incorporated herein by reference.

BACKGROUND OF THE INVENTION

1. Field of the Invention

The present invention relates to a device and a method used in a wireless communication system, and more particularly, to a device and a method of handling a cellular-wireless local area network (cellular-WLAN) aggregation after a handover.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network.

The LTE system may be aggregated with a wireless local area network (WLAN) to improve throughput of the LTE system (e.g., LTE-WLAN Aggregation (LWA)). That is, the eNB transmits/receives data via both LTE communication and WLAN communication to/from the UE.

SUMMARY OF THE INVENTION

The present invention therefore provides a communication device and method for handling a cellular-wireless local area network (cellular-WLAN) aggregation (CWA) to specify undefined operations for the CWA after a handover.

A communication device for handling a cellular-wireless local area network (cellular-WLAN) aggregation (CWA) comprises a storage device for storing instructions and a processing circuit coupled to the storage device. The processing circuit is configured to execute the instructions stored in the storage device. The instructions comprise receiving a first configuration configuring a CWA for a radio bearer, from a first cell of a cellular network; enabling the CWA for the radio bearer in response to the first configuration; communicating a plurality of cellular protocol data units (PDUs) associated to the radio bearer via a wireless local area network (WLAN) with the cellular network, when enabling the CWA for the radio bearer; receiving a handover command from the first cell, when enabling the CWA, wherein the handover command configures the communication device to perform a handover to a second cell of the cellular network; keeping enabling the CWA for the radio bearer in response to the handover command, when the handover command comprises a second configuration; and disabling the CWA for the radio bearer in response to the handover command, when the handover command does not comprise the second configuration.

A network for handling a cellular-wireless local area network (cellular-WLAN) aggregation (CWA) comprises a storage device for storing instructions and a processing circuit coupled to the storage device. The processing circuit is configured to execute the instructions stored in the storage device. The instructions comprise transmitting a first configuration configuring a CWA for a radio bearer to a first communication device via a first cell of the network; enabling the CWA for the radio bearer in response to configuring the CWA to the first communication device; communicating a first plurality of cellular protocol data units (PDUs) associated to the radio bearer via a WLAN with the first communication device, when enabling the CWA for the radio bearer; performing a first handover for the first communication device by transmitting a first handover command via the first cell to the first communication device, when enabling the CWA for the first communication device, wherein the first handover command configures the first communication device to perform the first handover to a second cell of the network; keeping enabling the CWA for the radio bearer in response to the first handover, when the first handover command comprises a second configuration related to the CWA; and disabling the CWA for the radio bearer in response to the first handover, when the first handover command does not comprises the second configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
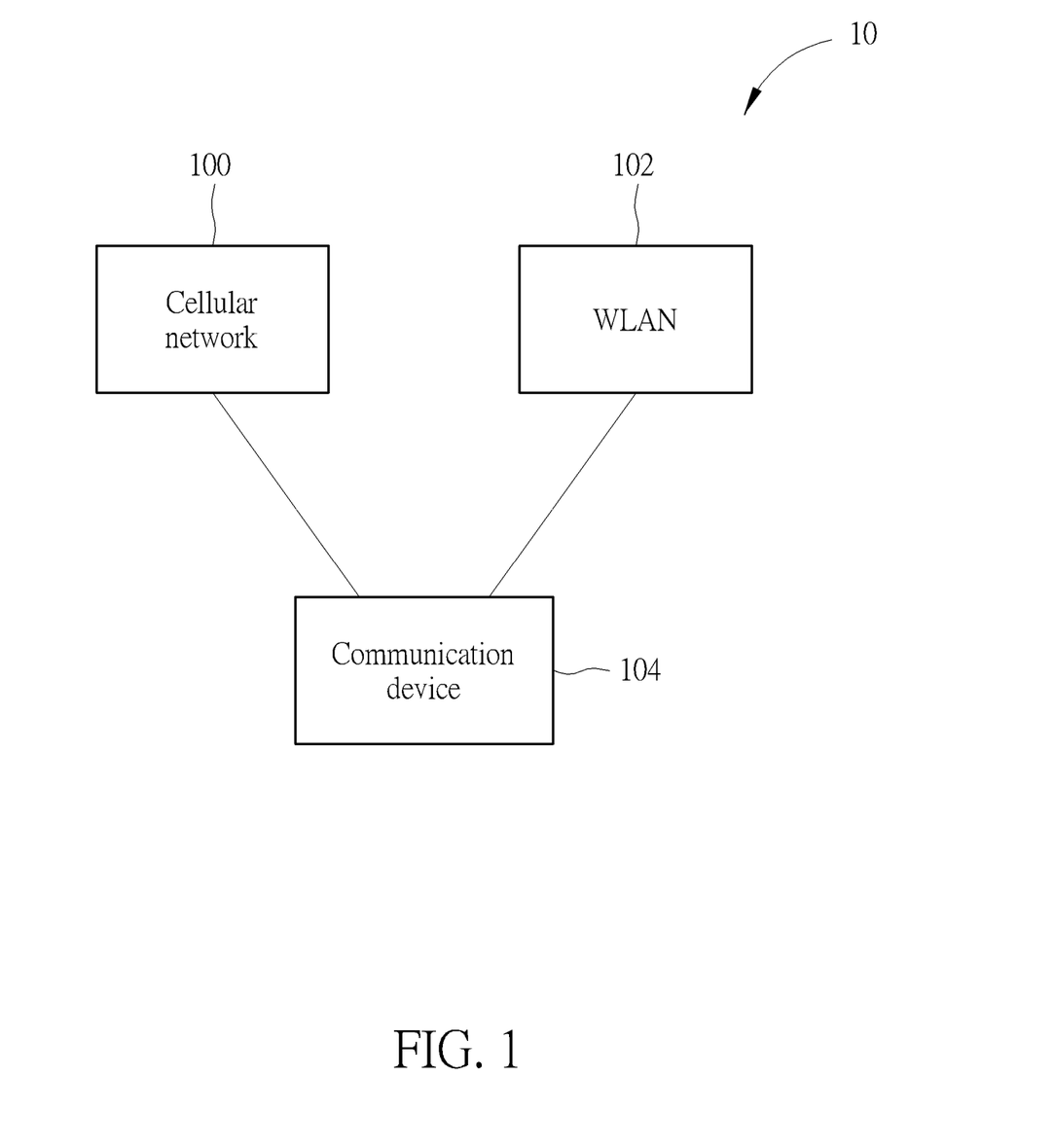
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. The cellular network 100 may be an evolved UTRAN (E-UTRAN) comprising at least one evolved NB (eNB). In another example, the cellular network 100 may be a fifth generation (5G) network including at least one 5G base station (BS) which employs orthogonal frequency-division multiplexing (OFDM) and/or non-OFDM, and a transmission time interval (TTI) for communicating with the communication devices is smaller than 1 millisecond (ms). In general, a BS is used to refer any of the eNB and the 5G BS. In one example, a WLAN standard operated by the WLAN may include IEEE 802.11ax, 802.ad, 802.11ac, 802.11n, 802.11g, 802.11b and 802.11a operated in a 2.4 GHz or 5 GHz band.

The communication device 104 can be a user equipment (UE), a mobile phone, a laptop, a tablet computer, an electronic book, a portable computer system, a vehicle or aircraft. In addition, the cellular network 100 (or the WLAN 102) and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
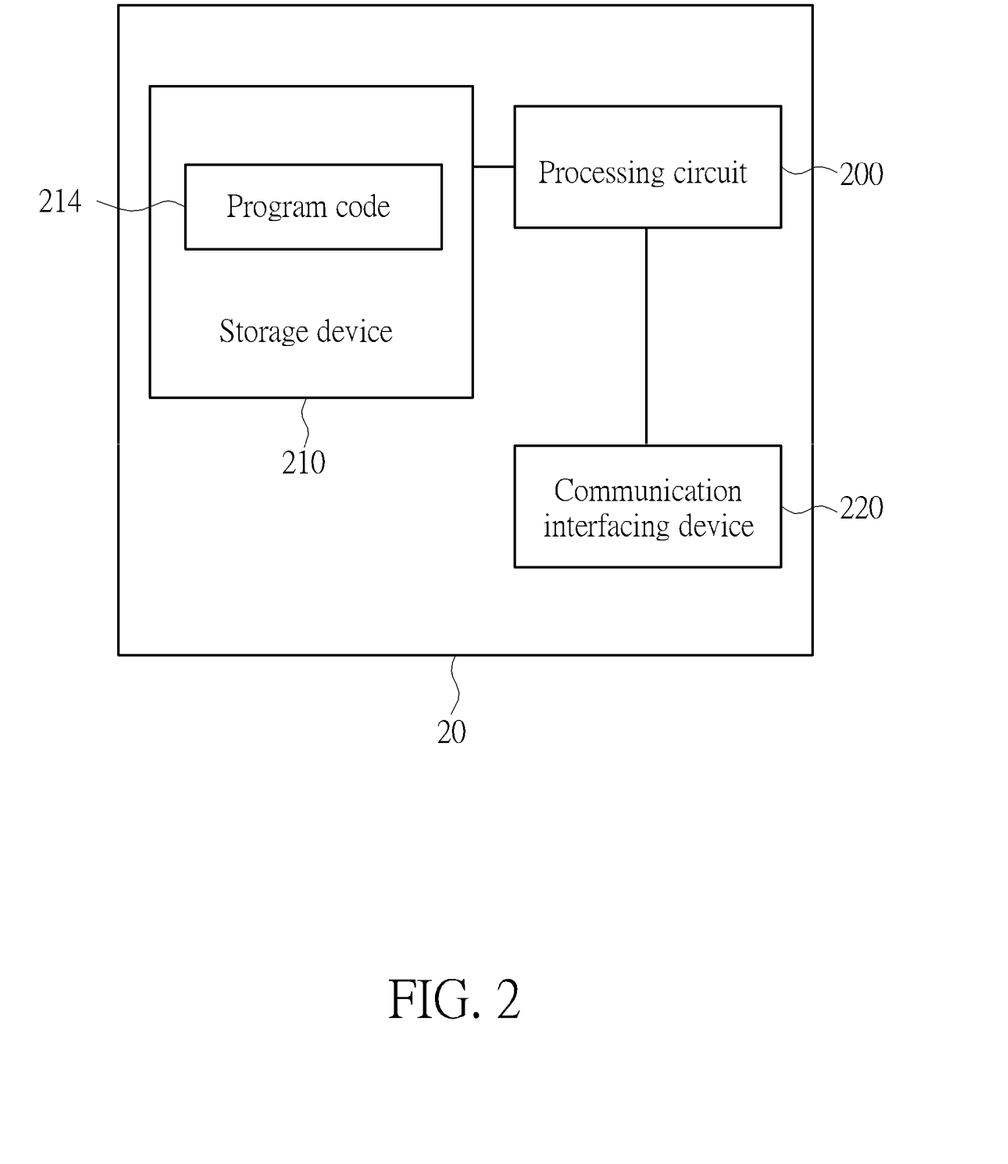
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following examples, a UE is used to represent the communication device 104 in FIG. 1 and a network is used to represent the cellular network 100 in FIG. 1, to simplify the illustration of the embodiments.

In a long-term evolution (LTE)-WLAN Aggregation (LWA), two bearer types exist for the LWA: split LWA bearer and switched LWA bearer. A 5G-WLAN aggregation (5GWA) may have bearers and radio protocols similar to those in the LWA.

In the DL, for protocol data units (PDUs) transmitted via (e.g., over) a WLAN in a LWA operation, a LWA Adaptation Protocol (LWAAP) entity generates LWAAP PDU(s) including a data radio bearer (DRB) identity. The UE uses the DRB identity to determine to which LWA bearer the PDUs belong to.

In the UL, for PDUs transmitted via the WLAN in the LWA operation, the LWAAP entity in the UE generates LWAAP PDU(s) including a DRB identity and transmits the LWAAP PDU(s) via the WLAN.

A scenario assumed according to an example of the present invention is stated as follows. The UE is configured with a LWA DRB and a first LWA configuration by a first eNB. The UE communicates LWAAP PDU(s) via a first WLAN (access point or WLAN termination (WT)) according to the first LWA configuration. When the UE receives a handover command (e.g., RRCConnectionReconfiguration including mobilityControlInfo) ordering the UE to hand over to a second eNB which may be the first eNB (e.g., intra-cell handover or inter-cell handover) or different from the first eNB (e.g., inter-eNB handover), the UE performs release of a LWA configuration (i.e., release the first LWA configuration). That is, the LWA is no longer configured once the LWA configuration is released. Security keys (e.g., S-$K_{WT}$ key and Pairwise Transient Key (PTK) used in the LWA are gone. In the release of the LWA configuration, the UE disables data handling for the LWA DRB, and may stop a WLAN connection attempt. The handover command may include a second LWA configuration for configuring a LWA. The second LWA configuration may configure the UE to perform the LWA with the first WLAN or a second WLAN. The UE applies the second LWA configuration. However, the UE does not enable the data handling for the LWA DRB when applying the second LWA configuration, because the UE only enables the data handling for cases where a LWA DRB is added or a DRB is reconfigured to be a LWA DRB from a LTE-only DRB. That is, the UE neither transmits packet data convergence protocol (PDCP) PDU(s) over the WLAN configured for the LWA nor processes any LWAAP PDU received from the WLAN configured for the LWA, after performing the handover. It is even not possible to make the UE to communicate (transmit and/or receive) the LWAAP PDU(s) with the first WT (i.e., the handover without WT change)

The following examples are provided to solve the above problem. A Cellular-WLAN aggregation (CWA) is used to represent at least one of a LWA and an aggregation of other cellular system (e.g., 5G) and a WLAN. It should be noted that 5G may be termed as new radio (NR) in a 3GPP standard.

Figure 3:
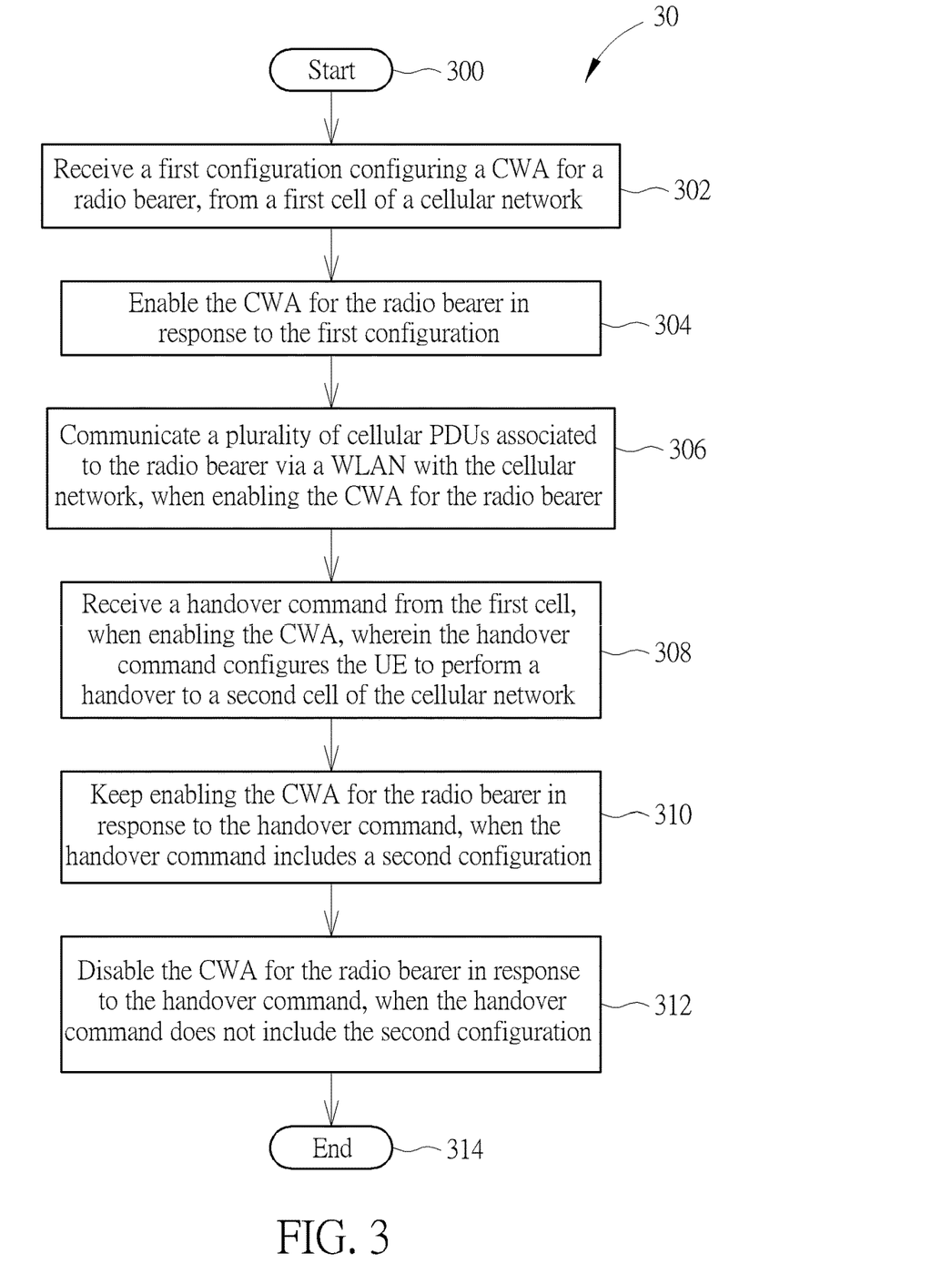
FIG. 3 is a flowchart of a process according to an example of the present invention.

FIG. 3 is a flowchart of a process 30 according to an example of the present invention and is utilized in a UE, to handle a CWA. The process 30 includes the following steps:

Step 300: Start.

Step 302: Receive a first configuration configuring a CWA for a radio bearer, from a first cell of a cellular network.

Step 304: Enable the CWA for the radio bearer in response to the first configuration.

Step 306: Communicate a plurality of cellular PDUs associated to the radio bearer via a WLAN with the cellular network, when enabling the CWA for the radio bearer.

Step 308: Receive a handover command from the first cell, when enabling the CWA, wherein the handover command configures the UE to perform a handover to a second cell of the cellular network.

Step 310: Keep enabling the CWA for the radio bearer in response to the handover command, when the handover command includes a second configuration.

Step 312: Disable the CWA for the radio bearer in response to the handover command, when the handover command does not include the second configuration.

Step 314: End.

In one example, the first configuration includes a first CWA configuration information element (IE) configuring the CWA for the radio bearer and does not include a specific IE, and the second configuration includes the specific IE. When the cellular network is a LTE network, the CWA is a LWA. The first configuration (e.g., CWA configuration) may be a LWA configuration defined in the 3GPP standard (e.g., a 3GPP release 13 version of 3GPP TS 36.331), and the specific IE may be a new IE defined in the 3GPP standard (e.g., a 3GPP release 14 version of 3GPP TS 36.331). Thus, the cellular network may transmit the specific IE to the UE supporting a 3GPP release including or later than 3GPP release 14 (i.e. the UE supports the specific IE). The cellular network may not transmit the specific UE to the UE supporting 3GPP release 13, since the UE supporting 3GPP release 13 does not recognize the specific IE (i.e. the UE does not support the specific IE). When the UE receives the specific IE, the UE continues or keeps the first configuration. In addition, the UE may not disable the data handling at a LWAAP entity and/or may not stop a WLAN status monitoring and WLAN connection attempt(s), in response to the handover command including the specific IE. When the handover command does not include the specific IE, the UE releases the first configuration, disables the data handling at the LWAAP entity and/or stops the WLAN status monitoring and the WLAN connection attempt(s). In one example, the specific IE indicates keeping of the first configuration (e.g., LWA configuration), indicates a UL LWA configuration (i.e., UL transmission over the WLAN for the LWA), indicates whether the UE should transmit the cellular PDU(s) via a LWAAP entity for the radio bearer, or indicates a threshold value for a UL data split operation in the LWA. It should be noted that the UL transmission(s) over the WLAN for the LWA is not supported in 3GPP release 13 but is supported from 3GPP release 14.

In one example, the UE determines that the handover is completed, when the UE successfully completes a random access procedure to the second cell or when the UE transmits a handover complete to the second cell.

In one example, the WLAN may be configured by the first configuration or by a third configuration received before receiving the first configuration. If the handover command configures the CWA, the handover command may configure the UE to use the WLAN configured by the first configuration or the third configuration or may configure the UE to use other WLAN different from the WLAN. To configure the UE to use the WLAN after the handover, the handover command may not include a fourth configuration configuring the CWA (e.g., imply keeping using the first configuration) or may include the first configuration. To configure the other WLAN, the handover command may include the fourth configuration. The first configuration and the third configuration may include a first WLAN identifier of the WLAN. The fourth configuration may include a second WLAN identifier of the other WLAN. The fourth configuration may be a second LWA configuration.

Figure 4:
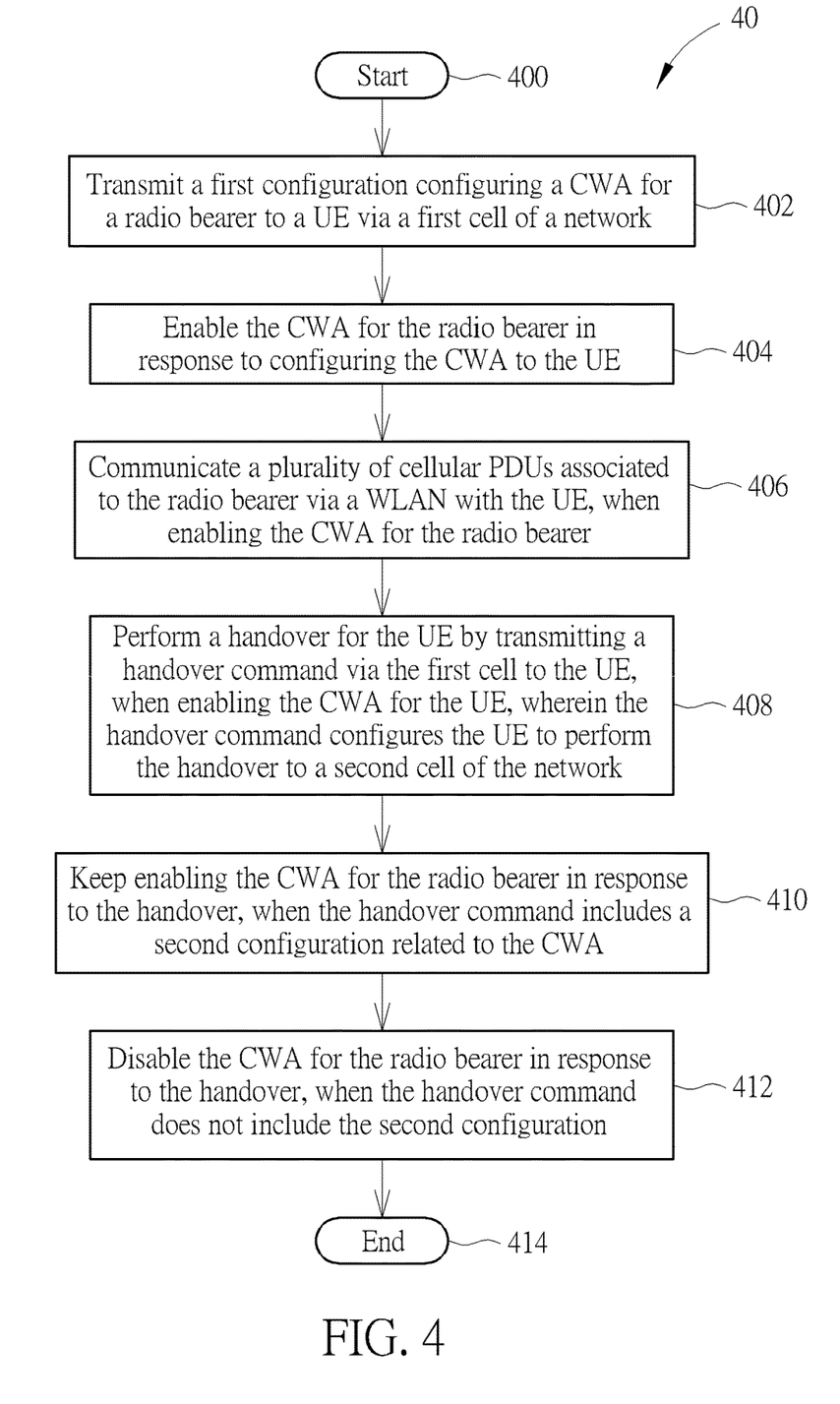
FIG. 4 is a flowchart of a process according to an example of the present invention.

FIG. 4 is a flowchart of a process 40 according to an example of the present invention and is utilized in a network including at least one BS, to handle a CWA. The process 40 includes the following steps:

Step 400: Start.

Step 402: Transmit a first configuration configuring a CWA for a radio bearer to a UE via a first cell of a network.

Step 404: Enable the CWA for the radio bearer in response to configuring the CWA to the UE.

Step 406: Communicate a plurality of cellular PDUs associated to the radio bearer via a WLAN with the UE, when enabling the CWA for the radio bearer.

Step 408: Perform a handover for the UE by transmitting a handover command via the first cell to the UE, when enabling the CWA for the UE, wherein the handover command configures the UE to perform the handover to a second cell of the network.

Step 410: Keep enabling the CWA for the radio bearer in response to the handover, when the handover command includes a second configuration related to the CWA.

Step 412: Disable the CWA for the radio bearer in response to the handover, when the handover command does not include the second configuration.

Step 414: End.

Examples for the process 30 may be applied to the process 40, and are not narrated herein.

The network may determine to transmit the specific IE to the UE in the handover command, when the UE supports 3GPP release including or later than 3GPP release 14. In response to the determination, the network continues or keeps the first configuration, and may not disable the data handling at a LWAAP entity. The network determines not to include the specific IE in the handover command transmitted to the UE, when the UE does not support 3GPP release including or later than 3GPP release 14. In response to the determination, the network releases the first configuration, and disables the data handling at the LWAAP entity. The UE may transmit a UE capability indicating that it supports 3GPP release (or the specific IE) to the network such that the network knows 3GPP release (or the specific IE) supported by the UE.

Figure 5:
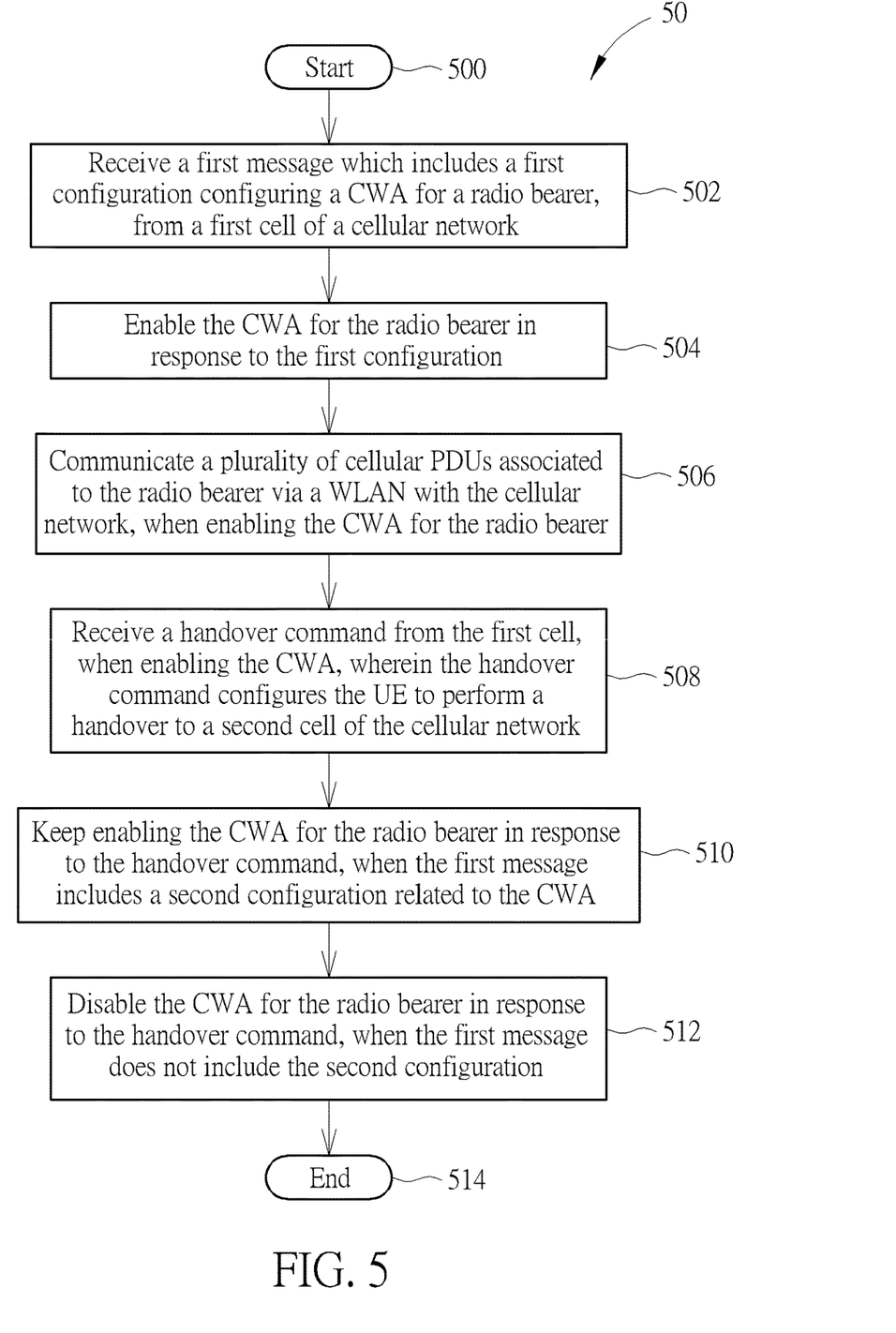
FIG. 5 is a flowchart of a process according to an example of the present invention.

FIG. 5 is a flowchart of a process 50 according to an example of the present invention and is utilized in a UE, to handle a CWA. The process 50 includes the following steps:

Step 500: Start.

Step 502: Receive a first message which includes a first configuration configuring a CWA for a radio bearer, from a first cell of a cellular network.

Step 504: Enable the CWA for the radio bearer in response to the first configuration.

Step 506: Communicate a plurality of cellular PDUs associated to the radio bearer via a WLAN with the cellular network, when enabling the CWA for the radio bearer.

Step 508: Receive a handover command from the first cell, when enabling the CWA, wherein the handover command configures the UE to perform a handover to a second cell of the cellular network.

Step 510: Keep enabling the CWA for the radio bearer in response to the handover command, when the first message includes a second configuration related to the CWA.

Step 512: Disable the CWA for the radio bearer in response to the handover command, when the first message does not include the second configuration.

Step 514: End.

In one example, the second configuration may be the specific IE described in the above examples, and is not narrated herein.

Figure 6:
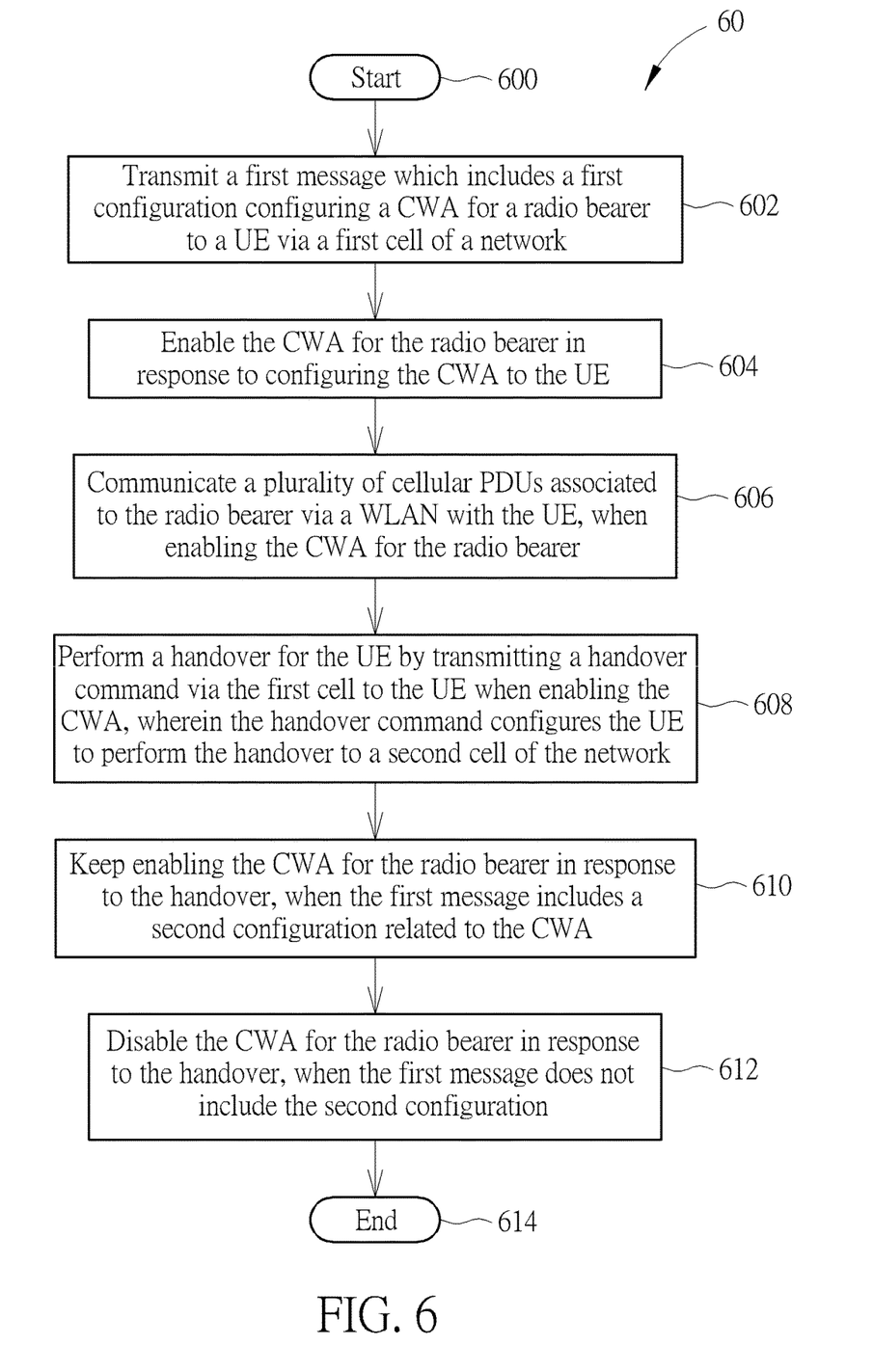
FIG. 6 is a flowchart of a process according to an example of the present invention.

FIG. 6 is a flowchart of a process 60 according to an example of the present invention and is utilized in a network, to handle a CWA. The process 60 includes the following steps:

Step 600: Start.

Step 602: Transmit a first message which includes a first configuration configuring a CWA for a radio bearer to a UE via a first cell of a network.

Step 604: Enable the CWA for the radio bearer in response to configuring the CWA to the UE.

Step 606: Communicate a plurality of cellular PDUs associated to the radio bearer via a WLAN with the UE, when enabling the CWA for the radio bearer.

Step 608: Perform a handover for the UE by transmitting a handover command via the first cell to the UE when enabling the CWA, wherein the handover command configures the UE to perform the handover to a second cell of the network.

Step 610: Keep enabling the CWA for the radio bearer in response to the handover, when the first message includes a second configuration related to the CWA.

Step 612: Disable the CWA for the radio bearer in response to the handover, when the first message does not include the second configuration.

Step 614: End.

In one example, the second configuration may be the specific IE described in the above examples, and is not narrated herein.

Figure 7:
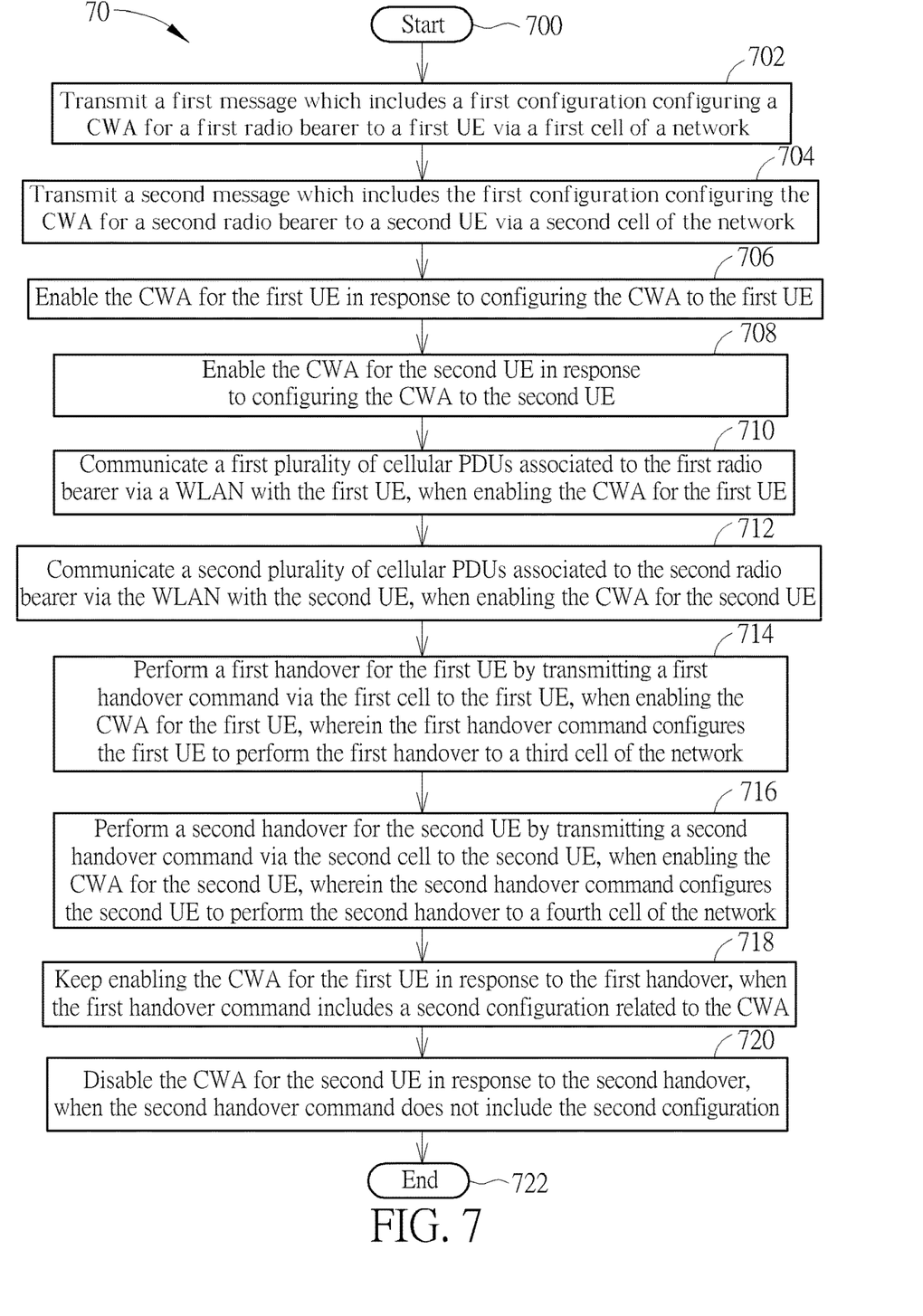
FIG. 7 is a flowchart of a process according to an example of the present invention.

FIG. 7 is a flowchart of a process 70 according to an example of the present invention and is utilized in a network, to handle a CWA. The process 70 includes the following steps:

Step 700: Start.

Step 702: Transmit a first message which includes a first configuration configuring a CWA for a first radio bearer to a first UE via a first cell of a network.

Step 704: Transmit a second message which includes the first configuration configuring the CWA for a second radio bearer to a second UE via a second cell of the network.

Step 706: Enable the CWA for the first UE in response to configuring the CWA to the first UE.

Step 708: Enable the CWA for the second UE in response to configuring the CWA to the second UE.

Step 710: Communicate a first plurality of cellular PDUs associated to the first radio bearer via a WLAN with the first UE, when enabling the CWA for the first UE.

Step 712: Communicate a second plurality of cellular PDUs associated to the second radio bearer via the WLAN with the second UE, when enabling the CWA for the second UE.

Step 714: Perform a first handover for the first UE by transmitting a first handover command via the first cell to the first UE, when enabling the CWA for the first UE, wherein the first handover command configures the first UE to perform the first handover to a third cell of the network.

Step 716: Perform a second handover for the second UE by transmitting a second handover command via the second cell to the second UE, when enabling the CWA for the second UE, wherein the second handover command configures the second UE to perform the second handover to a fourth cell of the network.

Step 718: Keep enabling the CWA for the first UE in response to the first handover, when the first handover command includes a second configuration related to the CWA.

Step 720: Disable the CWA for the second UE in response to the second handover, when the second handover command does not include the second configuration.

Step 722: End.

In one example, the second UE may support the 3GPP standard of release X (e.g., X=13) while the first UE may support the 3GPP standard of release Y (e.g., Y=14) later than X (i.e., the first UE supports the second configuration but the second UE does not support the second configuration). As described above, the network can know that the UE supports the second configuration defined in the 3GPP release supported by the UE. Thus, the network determines to include the second configuration in the first handover command, and determines not to include the second configuration in the second handover command. That is, the network determines to include the second configuration in a handover command according to or not according to the UE capability indicating support of the second configuration or not.

Figure 8:
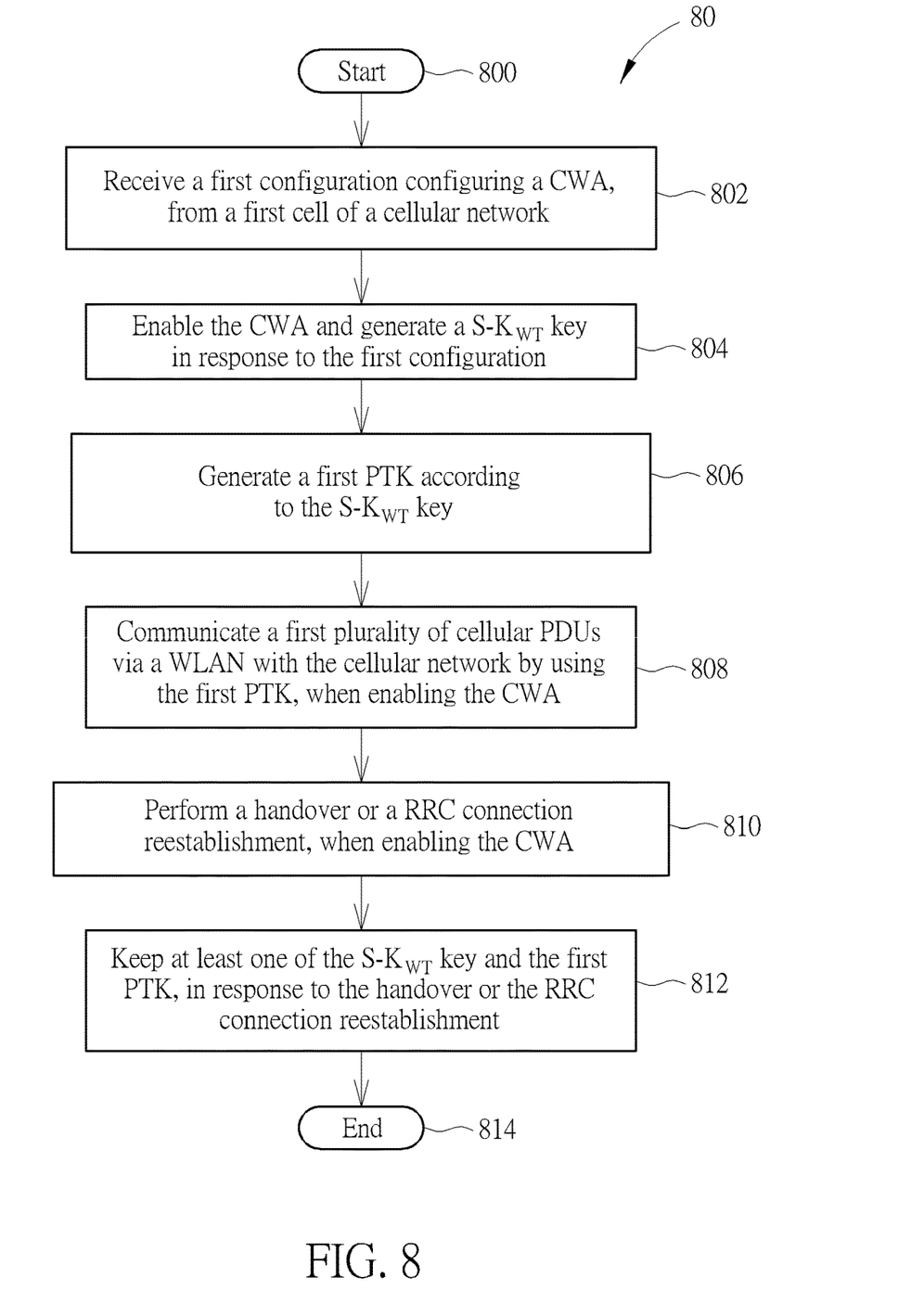
FIG. 8 is a flowchart of a process according to an example of the present invention.

FIG. 8 is a flowchart of a process 80 according to an example of the present invention and is utilized in a UE, to handle a CWA. The process 80 includes the following steps:

Step 800: Start.

Step 802: Receive a first configuration configuring a CWA, from a first cell of a cellular network.

Step 804: Enable the CWA and generate a S-$K_{WT}$ key in response to the first configuration.

Step 806: Generate a first pairwise transient key (PTK) according to the S-$K_{WT}$ key.

Step 808: Communicate a first plurality of cellular PDUs via a WLAN with the cellular network by using the first PTK, when enabling the CWA.

Step 810: Perform a handover or a RRC connection reestablishment, when enabling the CWA.

Step 812: Keep at least one of the S-$K_{WT}$ key and the first PTK, in response to the handover or the RRC connection reestablishment.

Step 814: End.

Figure 9:
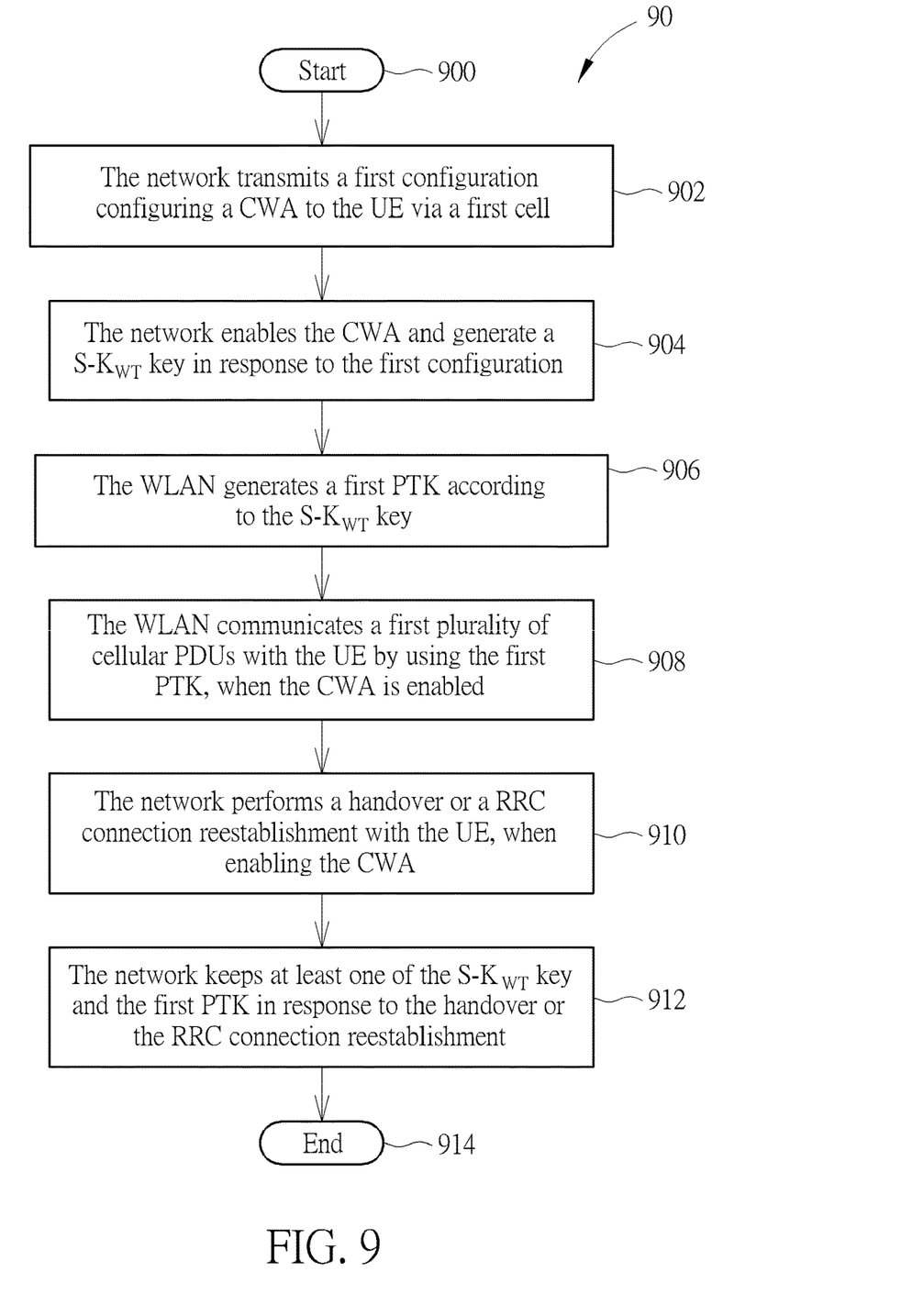
FIG. 9 is a flowchart of a process according to an example of the present invention.

FIG. 9 is a flowchart of a process 90 according to an example of the present invention and is utilized in a network and a WLAN, to handle a CWA. The process 90 includes the following steps:

Step 900: Start.

Step 902: The network transmits a first configuration configuring a CWA to the UE via a first cell.

Step 904: The network enables the CWA and generate a S-$K_{WT}$ key in response to the first configuration.

Step 906: The WLAN generates a first PTK according to the S-$K_{WT}$ key.

Step 908: The WLAN communicates a first plurality of cellular PDUs with the UE by using the first PTK, when the CWA is enabled.

Step 910: The network performs a handover or a RRC connection reestablishment with the UE, when enabling the CWA.

Step 912: The network keeps at least one of the S-$K_{WT}$ key and the first PTK in response to the handover or the RRC connection reestablishment.

Step 914: End.

According to the process 120, the network (e.g. a first BS) transmits a first configuration, and enables the CWA and generates a S-$K_{WT}$ key in response to the first configuration. The WLAN generates a first PTK according to the S-$K_{WT}$ key. The WLAN communicates a first plurality of cellular PDUs with the UE by using the first PTK, when the CWA is enabled. The network (e.g., the first BS or a second BS) performs a handover or a RRC connection reestablishment with the UE, when enabling the CWA. The network (e.g. the first BS or a second BS) keeps at least one of the S-$K_{WT}$ key and the first PTK in response to the handover or the RRC connection reestablishment.

In one example, the WLAN may keep the at least one of the S-$K_{WT}$ key and the first PTK, when the WLAN receives a WT release request from the first BS for the UE and a WT addition request for the UE from the second BS. The WT addition request may or may not include the S-$K_{WT}$ key.

The processes 80-90 may be used in a case where the network does not intend to configure a WT counter in a handover command or in a RRC connection reconfiguration message following a RRC connection reestablishment. That is, the network (e.g., the first BS or the second BS) may intend to keep using a WLAN security configuration configured by the first BS.

Realizations of the processes 80-90 are not limited to the above description.

In one example, the UE derives (e.g., generates) the first PTK according to the S-$K_{WT}$ key by using a first 4-way handshake procedure with the network (e.g., the WLAN or a WT connecting to the WLAN). The network initiates the first 4-way handshake procedure with the UE.

When the UE receives a handover command (which is received via the first cell from the network and orders the UE to perform the handover to a second cell) which configures the CWA but does not include a WT counter, the UE communicates a second plurality of cellular PDUs using the at least one of the S-$K_{WT}$ key and the first PTK via the WLAN after the handover. Similarly, the network performs corresponding (or the same) operations. In one example, the UE/network communicates the second plurality of cellular PDUs by using the first PTK via the WLAN with the network/UE after the handover. In one example, the UE/network communicates the second plurality of cellular PDUs by using a second PTK via the WLAN with the network/UE after the handover, wherein the UE and the network (e.g., the WLAN) derive the second PTK according to the S-$K_{WT}$ key by using a second 4-way handshake procedure with each other. The UE transmits a handover complete message to the network via the first cell or the second cell. That is, the UE/network may keep using the S-$K_{WT}$ key until the UE/network derives (or generate) another S-$K_{WT}$ key in response to a new WT counter configured. The UE/network may keep using the first PTK until the UE/network performs a 4-way handshake procedure.

When the UE receives a RRC connection reconfiguration message (which is received via the first cell or a second cell from the network following the RRC connection reestablishment) which configures the CWA but does not include a WT counter, the UE communicates the second plurality of cellular PDUs by using the at least one of the S-$K_{WT}$ key and the first PTK via the WLAN when/after/in response to receiving the RRC connection reconfiguration message. In one example, the UE communicates the second plurality of cellular PDUs by using the first PTK via the WLAN with the network when/after/in response to receiving the RRC connection reconfiguration message. In one example, the UE communicates the second plurality of cellular PDUs by using a second PTK via the WLAN with the network when/after/in response to receiving the RRC connection reconfiguration message, wherein the UE derives the second PTK from the S-$K_{WT}$ key by a second 4-way handshake procedure. The UE transmits a RRC connection reconfiguration complete message to the network via the first cell or the second cell.

In one example, at least one of the handover command and the RRC connection reconfiguration message configuring the CWA includes a CWA configuration (e.g., LWA configuration, an IE in the LWA Configuration, or the specific IE as described above).

The UE/network may or may not disable the CWA in response to the handover as described before or below, and is not repeated herein.

Figure 10:
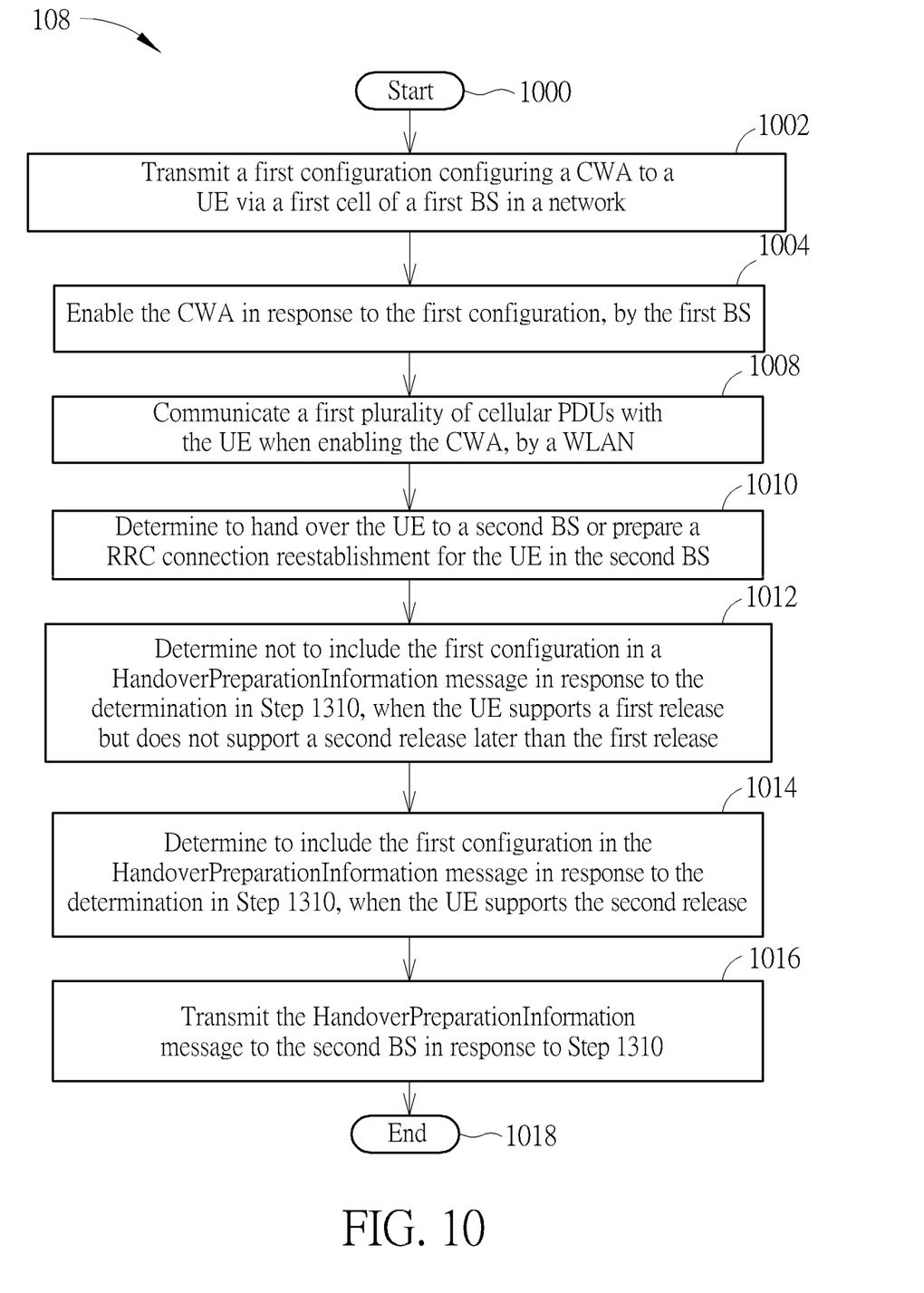
FIG. 10 is a flowchart of a process according to an example of the present invention.

FIG. 10 is a flowchart of a process 108 according to an example of the present invention and is utilized in a network, to handle a CWA. The process 108 includes the following steps:

Step 1000: Start.

Step 1002: Transmit a first configuration configuring a CWA to a UE via a first cell of a first BS in a network.

Step 1004: Enable the CWA in response to the first configuration, by the first BS.

Step 1008: Communicate a first plurality of cellular PDUs with the UE when enabling the CWA, by a WLAN.

Step 1010: Determine to hand over the UE to a second BS or prepare a RRC connection reestablishment for the UE in the second BS.

Step 1012: Determine not to include the first configuration in a HandoverPreparationInformation message in response to the determination in Step 1310, when the UE supports a first release but does not support a second release later than the first release.

Step 1014: Determine to include the first configuration in the HandoverPreparationInformation message in response to the determination in Step 1310, when the UE supports the second release.

Step 1016: Transmit the HandoverPreparationInformation message to the second BS in response to Step 1310.

Step 1018: End.

When the second BS receives the HandoverPreparationInformation message, the second BS determines that the UE supports keeping or continuing the CWA in the handover and/or the RRC connection reestablishment when the HandoverPreparationInformation message includes the first configuration (e.g., CWA configuration or LWA configuration) and the UE does not support keeping or continuing the CWA in the handover and/or the RRC connection reestablishment.

In one example, the first BS includes the first configuration in the HandoverPreparationInformation message for the UE, when the UE supports the LWA, and the 3GPP release 14 and releases after the 3GPP release 14. The first BS may not include the first configuration in the HandoverPreparationInformation message for the UE, when the UE supports the LWA and the 3GPP release 13.

Realization of the processes above is not limited to the above description.

In one example, when the UE/network enables the CWA, the UE/network processes a cellular PDU (e.g., a CWA adaption protocol (CWAAP) PDU, a LTE PDU such as a LTE PDCP PDU or a LWAAP PDU, or a 5G PDU such as a 5G PDCP PDU or a 5GWAAP PDU) received via the WLAN. In one example, enabling the CWA includes enabling the data handling for the radio bearer at a CWAAP entity in response to or after the handover. In one example, the data handling includes generating a first CWAAP PDU and transmitting the first CWAAP PDU to the WLAN, and/or includes processing a second CWAAP PDU received from the WLAN to obtain a CWAAP service data unit (SDU) included in the second CWAAP PDU.

Disabling the CWA and releasing the CWA (e.g., release of the LWA configuration) may be used interchangeably. The WLAN and the WT may be used interchangeably.

A UE may or may not support all functions defined in a 3GPP release. In one example, the UE indicates the 3GPP release supported by the UE to the network in UE capability information (e.g., UE-EUTRA-Capability IE). In one example, the UE indicates which specific function(s) (e.g., CWA and/or UL transmission(s) in the CWA) defined in the 3GPP release supported by the UE to the network in the UE capability information. Accordingly, the network knows the 3GPP release supported by the UE according to the UE capability information.

In one example, the first configuration is included in a first message (e.g., RRCConnectionReconfiguration message) which may include a drb-ToAddModList configuring a radio bearer and indicate the radio bearer as a CWA DRB (e.g., LWA DRB or 5GWADRB), i.e., adding the radio bearer as the CWA DRB to the UE or reconfiguring the radio bearer from a cellular only DRB to the CWA DRB. In one example, the cellular network may transmit a second message including the drb-ToAddModList to the UE. In one example, the handover command may or may not include the drb-ToAddModList.

In one example, the (first/second) UE receives the (first/second) message and the handover command on a RRC connection established between the (first/second) UE and the network. The (first/second) UE transmits the handover complete on the RRC connection to the network. In one example, the first cell and the second cell belong to a same BS or different BSs. In one example, the first cell and the second cell are a same cell or different cells. In one example, each of the first plurality of CWAAP PDUs includes a PDCP PDU. The PDCP PDU includes an Internet Protocol (IP) packet.

In one example, the UE/network stops a CWA operation (e.g., LWA operation defined by the 3GPP), when the UE/network disables a CWA. The CWA operation may include at least one of a WLAN status monitoring (for the UE if configured), running a timer for WLAN connection attempt (s) (for the UE if configured and running) and data handling at a CWAAP entity for a radio bearer. In one example, the UE/network (e.g., the UE and/or the network) disables the data handling at the CWAAP entity for the radio bearer by stopping processing a CWAAP PDU associated to the radio bearer and received from the WLAN. That is, the UE/network discards the received CWAAP PDU, when the UE/network disables the data handling. In one example, the UE/network processes the received CWAAP PDU, but the UE/network discards a LWAAP SDU (e.g., a PDCP PDU) in the received CWAAP PDU. Accordingly, decrypting the LWAAP SDU erroneously is avoided in the UE/network. In one example, the UE/network disables the data handling at the CWAAP entity for the radio bearer by stopping transmitting CWAAP PDU(s) associated to the radio bearer over the WLAN, if UL transmission(s) to the WLAN is configured by the cellular network for the CWA. That is, the UE/network does not transmit a CWAAP PDU including a PDCP PDU to the WLAN, when the UE/network disables the data handling at the CWAAP entity.

In one example, the UE/network starts a CWA operation (e.g., LWA operation defined by the 3GPP), when the UE/network enables a CWA. In one example, the UE/network enables data handling at a CWAAP entity for a radio bearer by starting processing a CWAAP PDU associated to the radio bearer and received from the WLAN. That is, the UE/network starts processing the CWAAP PDU, when the UE/network enables the data handling. In other words, the UE/network forwards a PDCP PDU in the received CWAAP PDU to its PDCP entity associated to the radio bearer. In addition, the UE/network enables the data handling at the CWAAP entity for the radio bearer by starting transmitting PDCP PDU(s) associated to the radio bearer by using the CWAAP entity, if UL transmission(s) to the WLAN is configured by the cellular network for the CWA. That is, the UE/network starts transmitting a CWAAP PDU including a CWAAP SDU (e.g., PDCP PDU) to the WLAN, when the UE/network enables the data handling at the CWAAP entity.

In one example, if a handover command includes an indicator indicating full configuration, the UE disables a CWA such as releasing a CWA configuration, disables data handling and stops a WLAN status monitoring. In one example, the UE does not connect to the WLAN, after disabling the CWA. In one example, the UE connects to the WLAN, after disabling the CWA.

As described above, the UE/network keeps enabling the CWA in response to the handover. After the handover, the UE/network keeps communicating a third plurality of cellular PDUs with the network/UE via the WLAN when the UE/network keeps enabling the CWA in response to the handover. The UE may perform a PDCP recovery procedure for a radio bearer to which the third plurality of cellular PDUs are associated in response to the handover when keep enabling the CWA.

Furthermore, when keeping enabling the CWA, the UE/network may keep a S-$K_{WT}$ key and/or a first PTK derived according to the S-$K_{WT}$ key, wherein the UE derives the S-$K_{WT}$ key from a WT counter and $K_{eNB}$ and derives the first PTK according to the S-$K_{WT}$ key (e.g., according to a first 4-way handshake procedure with the WLAN), before the handover. The WT counter is included in the CWA configuration. In one example, the UE/network communicates the third plurality of cellular PDUs with the network/UE via the WLAN by using the first PTK after the handover.

When the UE communicates a plurality of cellular PDUs with the network via the WLAN using a PTK, the UE encrypts or decrypts the plurality of cellular PDUs by using the PTK or encrypts or decrypts a plurality of WLAN Media Access Control (MAC) SDUs by using the PTK where each contains at least one cellular PDU of the plurality of cellular PDUs.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a communication device and a method for aggregating a LTE network and a WLAN.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A user equipment (UE) for handling a cellular-wireless local area network (cellular-WLAN) aggregation (CWA), comprising:
    a storage device, for storing instructions of:
    receiving a first configuration configuring a CWA for a radio bearer, from a first cell of a cellular network;
    enabling the CWA for the radio bearer in response to the first configuration;
    communicating a plurality of cellular protocol data units (PDUs) associated to the radio bearer via a wireless local area network (WLAN) with the cellular network, when enabling the CWA for the radio bearer;
    receiving a handover command from the first cell, when enabling the CWA, wherein the handover command configures the UE to perform a handover to a second cell of the cellular network;
    keeping enabling the CWA for the radio bearer in response to the handover command, when the handover command comprises a second configuration; and
    disabling the CWA for the radio bearer in response to the handover command, when the handover command does not comprise the second configuration; and
    a processing circuit, coupled to the storage device, configured to execute the instructions stored in the storage device.
2. The UE of claim 1, wherein the first configuration comprises a first CWA configuration information element (IE) configuring the CWA for the radio bearer and does not comprise a specific IE, and the second configuration comprises the specific IE.

3. The UE of claim 2, wherein the specific IE indicates keeping of the first configuration, indicates a UL LWA configuration, indicates whether the UE transmits the plurality of cellular PDUs via a long-term evolution (LTE)-WLAN Aggregation (LWA) Adaptation Protocol (LWAAP) entity for the radio bearer, or indicates a threshold value for an uplink (UL) data split operation in the LWA.

4. The UE of claim 1, wherein the storage device further stores the instruction of:
processing a cellular PDU received via the WLAN, when enabling the CWA.

5. The UE of claim 1, wherein enabling the CWA comprises enabling the data handling for the radio bearer at a CWA adaption protocol (CWAAP) entity in response to or after the handover.

6. The UE of claim 5, wherein the data handling comprises generating a first CWAAP PDU and transmitting the first CWAAP PDU to the WLAN, or comprises processing a second CWAAP PDU received from the WLAN to obtain a CWAAP service data unit (SDU) comprised in the second CWAAP PDU.

7. The UE of claim 1, wherein the storage device further stores the instructions of:
generating a security key (S-$K_{WT}$) in response to the first configuration;
generating a pairwise transient key (PTK) according to the S-$K_{WT}$;
communicating the plurality of cellular PDUs via the WLAN with the cellular network by using the PTK, when enabling the CWA;
performing the handover or a RRC connection reestablishment, when enabling the CWA; and
keeping at least one of the S-$K_{WT}$ and the PTK, in response to the handover or the RRC connection reestablishment.

8. The UE of claim 7, wherein the UE generates the PTK according to the S-$K_{WT}$ by using a 4-way handshake procedure with the network.

9. The UE of claim 1, wherein the first configuration is received in a RRCConnectionReconfiguration message.

10. A network for handling a cellular-wireless local area network (cellular-WLAN) aggregation (CWA), comprising:
a storage device, for storing instructions of:
transmitting a first configuration configuring a CWA for a radio bearer to a first user equipment (UE) via a first cell of the network;
enabling the CWA for the radio bearer in response to configuring the CWA to the first UE;
communicating a first plurality of cellular protocol data units (PDUs) associated to the radio bearer via a wireless local area network (WLAN) with the first UE, when enabling the CWA for the radio bearer;
performing a first handover for the first UE by transmitting a first handover command via the first cell to the first UE, when enabling the CWA for the first UE, wherein the first handover command configures the first UE perform the first handover to a second cell of the network;
keeping enabling the CWA for the radio bearer in response to the first handover command, when the first handover command comprises a second configuration related to the CWA; and
disabling the CWA for the radio bearer in response to the first handover, when the first handover command does not comprise the second configuration; and
a processing circuit, coupled to the storage device, configured to execute the instructions stored in the storage device.

11. The network of claim 10, wherein the first configuration comprises a first CWA configuration information element (IE) configuring the CWA for the radio bearer and does not comprise a specific IE, and the second configuration comprises the specific IE.

12. The network of claim 11, wherein the specific IE indicates the first UE to keep of the first configuration, indicates a UL LWA configuration, indicates whether the first UE transmits the plurality of cellular PDUs via a long-term evolution (LTE)-WLAN Aggregation (LWA) Adaptation Protocol (LWAAP) entity for the radio bearer, or indicates a threshold value for an uplink (UL) data split operation in the LWA.

13. The network of claim 10, wherein the storage device further stores the instruction of:
processing a cellular PDU received via the WLAN, when enabling the CWA.

14. The network of claim 10, wherein enabling the CWA comprises enabling data handling for the radio bearer at a CWA adaption protocol (CWAAP) entity in response to or after the first handover.

15. The network of claim 14, wherein the data handling comprises generating a first CWAAP PDU and transmitting the first CWAAP PDU to the WLAN, or comprises processing a second CWAAP PDU received from the WLAN to obtain a CWAAP service data unit (SDU) comprised in the second CWAAP PDU.

16. The network of claim 10, wherein the storage device further stores the instructions of:
generating a security key (S-$K_{WT}$) in response to the first configuration;
generating a pairwise transient key (PTK) according to the S-$K_{WT}$;
performing the first handover or a RRC connection reestablishment with the first UE, when enabling the CWA; and
keeping at least one of the S-$K_{WT}$ and the PTK, in response to the first handover or the RRC connection reestablishment.

17. The network of claim 16, wherein the network generates the PTK according to the S-$K_{WT}$ by using a 4-way handshake procedure with the first UE.

* * * * *